J. C. BUSCHE.
CUSHION TIRE.
APPLICATION FILED JAN. 23, 1920.

1,369,394.

Patented Feb. 22, 1921.
2 SHEETS—SHEET 1.

Inventor
John C. Busche

By
Attorney

J. C. BUSCHE.
CUSHION TIRE.
APPLICATION FILED JAN. 23, 1920.

1,369,394.

Patented Feb. 22, 1921.
2 SHEETS—SHEET 2.

Inventor
John C. Busche
By
O. E. Trainor.
Attorney ously known that I, JOHN C. BUSCHE, a
UNITED STATES PATENT OFFICE.

JOHN C. BUSCHE, OF HIGHLAND PARK, MICHIGAN.

CUSHION-TIRE.

1,369,394.
Specification of Letters Patent.
Patented Feb. 22, 1921.

Application filed January 23, 1920. Serial No. 353,406.

*To all whom it may concern:*

Be it known that I, JOHN C. BUSCHE, a citizen of the United States, and a resident of Highland Park, in the county of Wayne and State of Michigan, have invented certain new and useful Improvements in Cushion-Tires, of which the following is a specification.

My invention is an improvement in cushion tires, and has for its object to provide a tire of the character specified, having the resiliency of a pneumatic tire without its liability to injury, wherein the tread of the tire is composed of spaced connected tread blocks, which are mounted to yield toward and from the hub.

In the drawings:—

Figure 1:
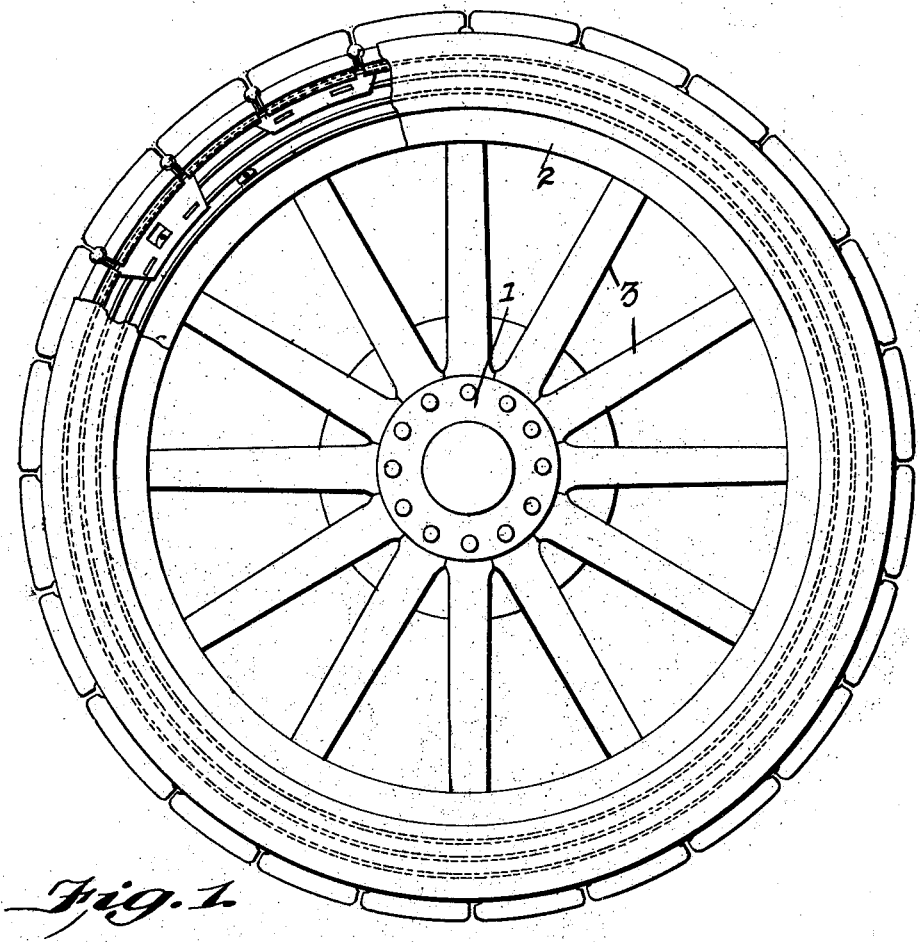
Figure 1 is a side view of the improved wheel with a part in section.

In the present embodiment of the invention, the improved tire is shown in connection with a wheel consisting of the usual hub 1, the felly 2, and the spokes 3 connecting the hub and the felly.

A housing rim is arranged on the felly 2, the said rim being an annular channel shaped casing consisting of a bottom 4 which rests upon the peripheral surface of the felly, and side walls 5 which extend radially from the bottom. A series of annular flat seamless springs 6, 7 and 8 is arranged coaxially with the wheel, within the channel shaped casing, Bolts 9 extend between the side walls 5 of the channel shaped casing at suitable intervals, between the springs 6 and 7, and these bolts are engaged by nuts 10 on the outer face of the casing side wall. Connecting and spacing blocks 11ᵃ are arranged between the spring 6 and the bottom 4 of the rim, and similar blocks 11 are arranged between the springs 6 and 7, the latter series of blocks being held by the bolts 9 before mentioned, while the former series of blocks is held by similar bolts 12. The bolts 9 and 12 pass through openings in the side walls 5 of the rim 4—5, and through longitudinally extending openings in the spacing blocks 11 and 11ᵃ and are engaged by nuts outside of the rim. The spacing blocks 11ᵃ space the spring 6 from the bottom of the rim, while the spacing blocks 11 space the spring 7 from the spring 6, that is, the spacing blocks properly space the springs 6 and 7.

Figure 2:
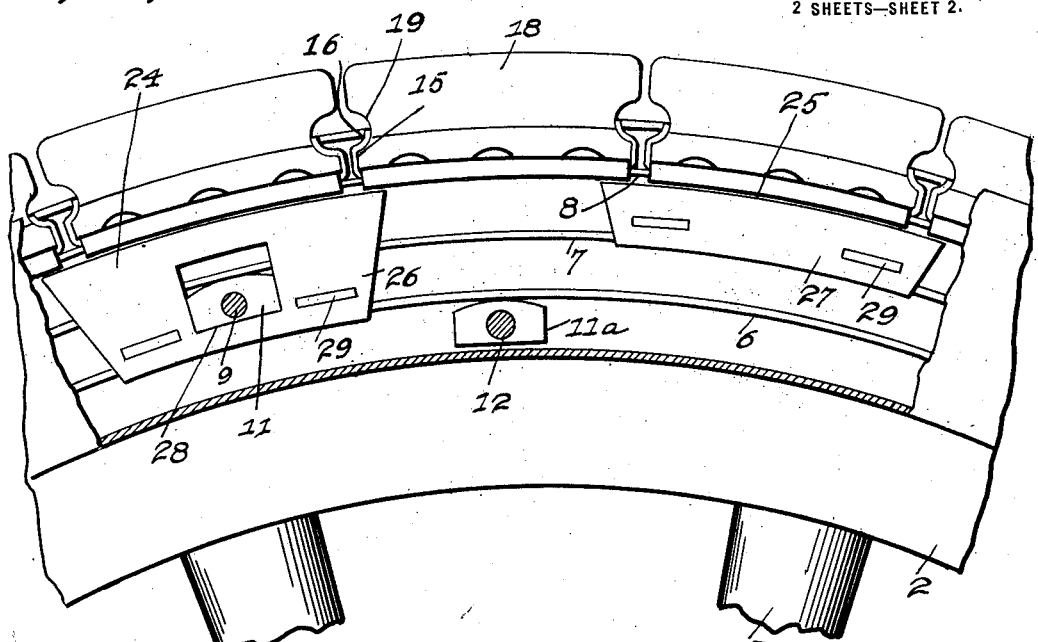
Fig. 2 is an enlarged detail of a portion of the wheel.

Referring to Fig. 2, it will be seen that each spring 6 and 7 is supported by a series of spacing blocks, and that the outer faces of the blocks are rounded transversely so that the springs may be rocked thereon.

Figure 4:
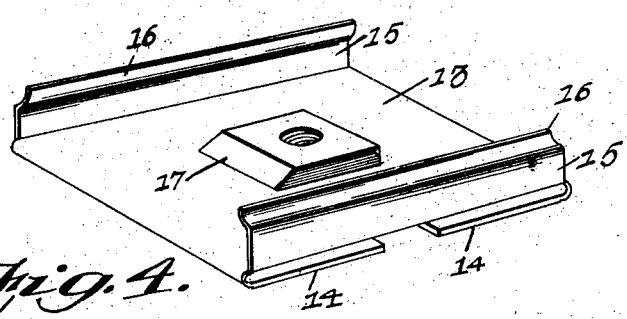
Fig. 4 is a perspective view of one of the tread block holders.

These blocks are bored longitudinally to receive the bolts, and they are arranged at suitable intervals about the circumference of the wheel. The holders for the tread plates one of which is shown particularly in Fig. 4, are plates 13, which have inwardly turned flanges 14 underlying the inner face of the plates in spaced relation, and the spring 8 is received between these flanges 14 and the body of the plate. Thus the holders are held on the spring 8.

Each holder has at its ends outstanding flanges or ribs 15, and each of these ribs has an inwardly offset portion 16 at its free edge. Each holder is also provided with a threaded opening at its center and with an enlargement 17 at the opening forming a reinforcement for the opening.

The tread blocks 18 are of resilient material, as for instance, rubber, and each block seats upon a holder, resting upon the body 13 thereof between the flanges 16, and the ends of the blocks as shown more particularly in Fig. 2 are recessed transversely as shown at 19 to receive the inwardly offset portion 16 of the flanges 15.

The inner surfaces of these blocks are also grooved transversely as shown in Fig. 2, to increase resiliency. Each of the side walls 5 of the channel shaped casing has an inwardly extending lip 20 at its outer edge, and these lips engage in rabbets 21 at the sides of the block. The rabbets extend from the outer face of the block, and the lips prevent outward movement of the blocks by engaging in the rabbets, and also prevent lateral movement of the blocks.

Figure 3:
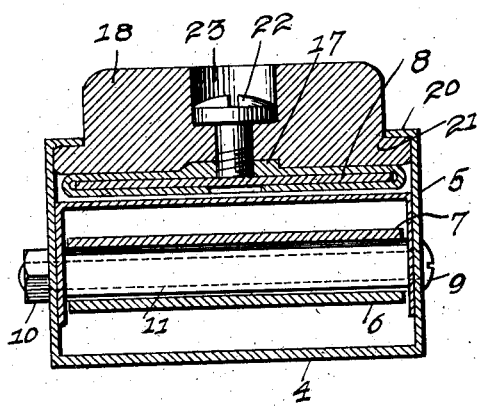
Fig. 3 is a radial section through the tire.

Each block is held to the adjacent holder by means of a screw 22 which passes through the block and engages the threaded opening of the holder. The heads of these screws are counter-sunk in recesses 23 in the blocks as clearly shown in Fig. 3.

Substantially channel shaped or U-shaped pressure members are arranged at alternate tread block holders. Two series of these members are provided, a series 24, and a series 25, and the members of the series are alternately arranged. The members of the series 24 have inwardly extending flanges or lips 26 at their ends, which extend radially inward beyond the spring 6.

The members of the other series 25 have similar flanges 27, which however extend only beyond the spring 7. The flanges 26 and 27 engage the opposite side edges of the springs, thus limiting the lateral movement of the pressure members. The member 24 has openings 28 in its flanges 26 in which the ends of the spacing blocks 11 engage, and the bolts 9 pass through these openings.

The flanges of the members of both series are connected by cross plates 29, the said cross plates being near the ends of the pressure members. These cross plates engage openings in the flanges, and may be upset to prevent disengagement. The cross plates 29 rest upon the springs 6 and 7, the cross plates of the pressure members 24 resting on the spring 6, while those of the series 25 rest upon the spring 7. Thus the alternate tread blocks are supported by the springs 6 and 7, half of the alternate blocks being supported by the spring 6 and the other half of the alternate blocks being supported by the spring 7. The improved tire may be manufactured at a very low cost, and is not subject to the injury that may put a pneumatic tire out of commission, such as punctures, blow-outs, and the like. The tread blocks are easily removed when desired, and the entire tire may be easily assembled.

I claim:—

1. A cushion tire comprising a channel shaped casing of annular form adapted to seat on the felly of a wheel, a series of annular springs arranged within the casing coaxial with the wheel and spaced apart from each other and from the bottom of the casing, a series of tread block holders connected with the outermost spring, a tread block carried by each holder, and series of spacing blocks for the inner springs for holding said springs in properly spaced relation, means for engaging the springs to properly space the outer spring from said inner springs, the alternate members of the said means engaging the innermost spring, while the intermediate members of the said means engage the intermediate spring.

2. A cushion tire comprising a channel shaped casing of annular form adapted to seat on the felly of a wheel, a series of annular springs arranged within the casing coaxial with the wheel and spaced apart from each other and from the bottom of the casing, a series of tread block holders connected with the outermost spring, a tread block carried by each holder, and a series of spacing blocks for each of the inner springs for holding said springs in properly spaced relation, means adjacent to the outer spring for engaging the inner springs to properly space the outer spring from said inner springs.

3. A cushion tire comprising a channel shaped casing of annular form adapted to seat on the felly of a wheel, a series of annular springs arranged within the casing coaxial with the wheel and spaced apart from each other and from the bottom of the casing, a series of tread block holders connected with the outermost spring, a tread block carried by each holder, and a series of spacing blocks for each of the inner springs for holding said springs in properly spaced relation, means adjacent to the outer spring for engaging the inner springs to properly space the outer spring from said inner springs, the tread blocks being detachably connected with the holders, each holder having outstanding flanges at its ends provided with inwardly offset portions at their free edges, the ends of the tread blocks being recessed to receive the inwardly offset portions.

4. A cushion tire comprising a channel shaped casing of annular form adapted to seat on the felly of a wheel, a series of annular springs arranged within the casing coaxial with the wheel and spaced part from each other, a series of tread block holders connected with the outermost spring, a tread block carried by each holder, a series of spacing blocks for each inner spring connected with the casing and having transversely rounded outer faces, bolts connecting said blocks to the channel shaped casing side walls, and pressure members between the outermost and the adjacent annular spring.

5. A cushion tire comprising a channel shaped casing of annular form adapted to seat on the felly of a wheel, a series of annular springs arranged within the casing coaxial with the wheel and spaced apart from each other, a series of tread block holders connected with the outer-most spring, a tread block carried by each holder, a series of means between certain of the springs for properly spacing the springs from each other, the said means being connected with the channel shaped casing.

6. A cushion tire comprising a channel shaped casing of annular form adapted to seat on the felly of the wheel, a series of annular springs arranged coaxial with the wheel within the casing, means between the outermost spring and each of the other springs for properly spacing said springs from each other, and a series of spacing blocks for the inner spring and for the intermediate spring connected with the channel shaped casing.

7. A cushion tire, comprising a rim adapted to seat on the felly of a wheel, a series of annular springs arranged about the wheel, means connected with the rim for holding sundry of said springs in spaced relation, tread blocks connected to the outer spring, pressure members having flanges on opposite sides of the inner and intermediate springs, and cross plates connecting said flanges and resting on the inner and intermediate springs.

8. A resilient tire comprising a rim adapted to seat on the felly of a wheel, a series of annular springs surrounding said rim, means associated with the rim for holding sundry of said springs in spaced relation, yieldable tread elements connected with said springs, U-shaped pressure members having flanges on opposite sides of the intermediate and inner springs, and cross plates connected to said flanges and resting on the intermediate and inner springs.

9. A cushion tire comprising a casing having side walls, annular springs surrounding said casing and arranged between said side walls, spacing blocks between certain of said springs and the inner wall of said casing and having their outer faces curved transversely, and bolts connecting said spacing blocks to said side walls.

10. A cushion tire comprising a casing having side walls, annular springs surrounding said casing and arranged between said side walls, spacing blocks between certain of said springs and the inner wall of said casing, and having their outer faces curved transversely, bolts connecting said spacing blocks to said side walls, and spaced pressure plates associated with the outer spring at spaced points and having connection with the inner and intermediate springs.

JOHN C. BUSCHE.